(12) United States Patent
Moessinger et al.

(10) Patent No.: US 9,481,032 B2
(45) Date of Patent: Nov. 1, 2016

(54) METAL CASTING AND METAL CASTING PROCESS

(75) Inventors: Oliver Moessinger, Forst (DE);
Juergen Neubrander, Stuttgart (DE);
Dieter Schaffert, Bietigheim-Bissingen (DE); Ralph Renz, Sindelfingen (DE);
Jan Bela, Schoemberg (DE); Marcus Gregor Sedlmayr, Vaihingen/Enz (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 995 days.

(21) Appl. No.: 13/099,428

(22) Filed: May 3, 2011

(65) Prior Publication Data
US 2011/0281133 A1 Nov. 17, 2011

(30) Foreign Application Priority Data
May 15, 2010 (DE) .................. 10 2010 020 682

(51) Int. Cl.
| | |
|---|---|
| B22D 19/04 | (2006.01) |
| F16B 37/12 | (2006.01) |
| B22D 17/24 | (2006.01) |
| B22D 19/00 | (2006.01) |

(52) U.S. Cl.
CPC ............... *B22D 17/24* (2013.01); *B22D 19/00* (2013.01); *B22D 19/04* (2013.01); *F16B 37/122* (2013.01); *Y10T 428/12389* (2015.01)

(58) Field of Classification Search
USPC .......................... 428/614, 650–654
See application file for complete search history.

(56) References Cited

U.S. PATENT DOCUMENTS

| | | | | |
|---|---|---|---|---|
| 2005/0084362 | A1* | 4/2005 | Nah, II ........................ | 411/180 |
| 2005/0217819 | A1* | 10/2005 | Miyake et al. ............... | 164/98 |
| 2009/0129885 | A1* | 5/2009 | Csik ..................... | F16B 37/046 |
| | | | | 411/103 |

FOREIGN PATENT DOCUMENTS

| | | |
|---|---|---|
| DE | 39 12 664 | 3/1990 |
| DE | 91 15 292 | 4/1992 |
| DE | 197 46 167 | 4/1999 |
| DE | 199 43 247 | 1/2001 |
| DE | 100 12 787 | 9/2001 |
| JP | 2005297038 | 10/2005 |

\* cited by examiner

*Primary Examiner* — David Sample
*Assistant Examiner* — Lucas Wang
(74) *Attorney, Agent, or Firm* — Gerald E. Hespos; Michael J. Porco; Matthew T. Hespos

(57) ABSTRACT

A metal casting has a metal casting base body into which at least one metal insert body (1) is cast. The metal insert body has anti-twisting part-contours and is connected to the metal casting base body in a positively locking manner by the casting-in. To simplify the production of a stable metal casting, the metal insert body (1) has an elongate shape with a longitudinal axis and an outer mold contour with an unround cross section interrupted in the longitudinal direction by annular grooves (11-13) that fix the cast-in metal insert body (1) in the axial direction.

17 Claims, 6 Drawing Sheets

METAL CASTING AND METAL CASTING PROCESS

CROSS REFERENCE TO RELATED APPLICATION

This application claims priority under 35 USC 119 to German Patent Application No 10 2010 020 682.2 filed on May 15, 2010, the entire disclosure of which is incorporated herein by reference.

BACKGROUND OF THE INVENTION

1. Field of the Invention

The invention relates to a metal casting comprising a metal casting base body into which at least one metal insert body is cast. The metal insert body has anti-twisting part-contours and is connected to the metal casting base body in a positively locking manner by casting-in. The invention also relates to a metal casting process for producing a metal casting, wherein a metal insert body is positioned in a cavity between at least two mold halves before it is cast into a metal casting base body.

2. Description of the Related Art

German laid-open specification DE 197 46 167 A1 discloses a light metal component having at least one insert with undercut part-contours for absorbing tensile and bending loading and anti-twisting part-contours for absorbing torsional loading. German laid-open specification DE 39 12 664 A1 discloses a light metal casting with a fastening means arranged in the casting and a fiber insert to increase stability of the anchoring of the fastening means in the casting. German utility model DE 91 15 292 U1 discloses a threaded sleeve or a threaded bolt to be embedded in plastics material. US 2005/0084362 A1 discloses securing a threaded insert for a carrier of a motor vehicle in the carrier by injecting plastic into gaps between the threaded insert and the carrier surface.

SUMMARY OF THE INVENTION

The invention relates to a metal casting comprising a metal casting base body into which at least one metal insert body is cast. The metal insert body has anti-twisting part-contours and is connected to the metal casting base body in a positively locking manner by the casting-in. The metal insert body has an elongate shape with a longitudinal axis and an outer mold contour with an unround cross section. The metal insert body is interrupted in the longitudinal direction by annular grooves that fix the cast-in metal insert body in the axial direction. The metal casting is used in a motor vehicle, preferably in a chassis, a vehicle body or the drive region of a motor vehicle. The combination of the unround cross section and the annular grooves in the outer mold contour enable the cast-in metal insert body to be subjected to higher loading than in the case of conventional metal castings.

The outer mold contour may have a polygonal cross section with straight, curved or rounded edges. The cross section also may be unround or an orbiform with curved edges when formed as an extruded profile.

The outer mold contour of the metal insert body may have substantially the shape of a triangle, a tetragon, a hexagon or an octagon. Corners may be straight or rounded or curved. The polygonal shape simplifies chucking of the metal insert body in a three-jaw chuck or four-jaw chuck, for example for material-removing machining.

The annular grooves of the metal inset body may have a substantially rectangular groove cross section. The rectangular groove cross section may be rounded in the corners. The rectangular cross section securely fixes the metal insert body in the metal casting base body in the axial direction.

The annular grooves preferably are machined with the removal of material. The polygonal cross section makes it possible to machine the metal insert body with the removal of material, for example by turning.

The metal insert body with the outer mold contour and the annular grooves preferably is cast completely into the metal casting base body. As a result, the metal insert body is anchored in a stable manner in the metal casting base body. A functional region, for example a functional opening or a functional bolt, may be freely accessible on the outside of the metal casting after the metal insert body has been cast in.

The metal insert body may have a functional opening. The functional opening forms part of a hole that may be a clearance hole or a blind hole and preferably has an internal thread. Material may be stored between the thread and the outer mold contour to increase the strength or stability of the metal insert body. The storage of material additionally makes it possible to insert a threaded insert for purposes of a repair.

The metal casting may have a functional opening that comprises a counterbore for positioning the metal insert body before casting-in. The counterbore preferably is a cylindrical counterbore. Transitions to the cylindrical counterbore may be chamfered.

The metal casting may be characterized in that the metal insert body has a functional bolt and the functional bolt may have an external thread.

The metal casting base body may be formed from light metal. For example, the metal casting base body may be formed from a light metal alloy containing aluminum and/or magnesium, in particular an aluminum alloy or a magnesium alloy. The metal insert body may be formed from aluminum or an aluminum alloy or a wrought aluminum alloy.

The metal insert body may be formed from an aluminum material or a steel material and may contain titanium. The steel material enables the metal insert body to be subjected to higher loading. The metal insert body also may be formed from titanium or a titanium alloy.

The metal insert body may be formed from a bar material and may have an extruded profile, a rolled profile or an impact-extruded part. The bar material may be machined with removal of material, for example by turning, to form annular grooves.

The metal insert body may be rolled, drawn, forged or produced by impact extrusion. The metal insert body may also be formed by metal injection molding (MIM) and subsequent sintering.

The outer mold contour preferably has an increased surface roughness to prevent twisting.

An end face of the metal insert body preferably is formed to prevent the injection or penetration of metal into the metal insert body during casting. For example, the metal insert body may be closed at one end face and open at the other end face for threadedly receiving a screw. Penetration of metal into the interior of the metal insert body can be prevented by an appropriate overlap of the metal insert body with the mold half of a casting mold that bears against it. Alternatively or additionally, the tightness can be realized by a groove system. By way of example, the open end of the insert body can engage into an annular groove that is cut out in the associated mold half. A functional opening in the metal insert body also can be closed by a closure plug during casting. An insert pin or a set screw also can be arranged in the functional opening during casting to fill up the insert body in a manner to prevent penetration of metal into the insert body.

A metal casting process also is provided for producing a metal casting. The process comprises positioning a metal insert body in a cavity between at least two mold halves and then casting the metal insert body into a metal casting base body. The metal insert body may be positioned with the aid of at least one positioning pin before, during and/or after the casting-in. The positioning pin extends through one of the two mold halves into the cavity and is pretensioned counter to the metal insert body. The positioning pin can be pretensioned hydraulically or with the aid of a spring. The metal casting process is preferably a die-casting process. However, gravity casting or low-pressure casting processes can also be employed as an alternative.

The metal casting process may include positioning the metal insert body between the positioning pin and a positioning lug before, during and/or after the casting-in. The positioning lug may be formed on the other of the two mold halves and may engage in an opening in the metal insert body. The positioning lug also may be attached to an additional positioning pin that can be moved back and forth in the other mold half.

The positioning lug may have the shape of a straight circular cylinder that engages into the metal insert body. The positioning lug preferably engages with little play, into the cylindrical counterbore in the functional opening. The positioning lug may have a slightly conical design so that the insert body can be positioned by slight self-locking on one of the mold halves before the casting-in.

The invention further relates to a mold for producing the metal casting described above with the aid of the metal casting process described above.

Further advantages, features and details of the invention will become apparent from the following description, in which various exemplary embodiments are described in detail with reference to the drawing.

DETAILED DESCRIPTION OF THE PREFERRED EMBODIMENTS

Figure 1:
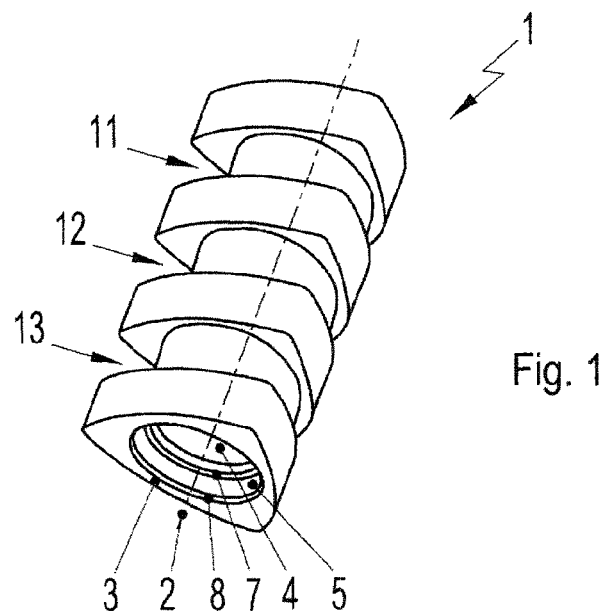
FIG. 1 is a perspective illustration of a metal insert body with a polygonal cross section.

FIG. 1 is a perspective view of an elongate metal insert body 1 that has a longitudinal axis 2 and a functional opening 3 at one end. The functional opening 3 forms part of a blind hole 4 provided with a thread. A cylindrical counterbore 5 is provided at the visible end of the internal thread. An inner chamfer 7 is formed at the transition between the internal thread and the cylindrical counterbore 5 and an outer chamfer 8 is formed on the outside of the cylindrical counterbore 5.

The insert body 1 has the cross-sectional shape of an equilateral triangle with convexly curved sides. However, the triangular cross section of the metal insert body 1 is interrupted by annular grooves 11, 12, 13 that are spaced apart along the longitudinal axis 2. The annular grooves 11 to 13 form circumferential protrusions on the outside of the metal insert body 1. The protrusions function to fix the metal insert body 1 in the axial direction after the casting-in. The triangular cross section functions to fix the metal insert body 1 and prevents twisting after the casting-in described further below.

The metal insert body 1 may be formed from aluminum. In this case, a blank may be formed as an extruded profile and then machined by turning. The aluminum material preferably is an alloy, for example a wrought aluminum alloy.

For reasons relating to strength, the metal insert body 1 also may be formed from steel. In this case, a blank may be rolled or drawn and then may be machined by an automatic lathe.

Figure 2:
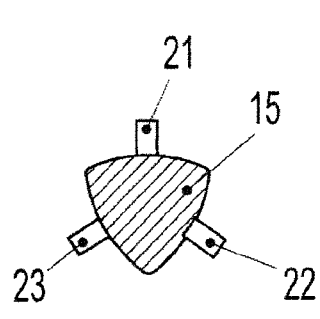
FIGS. 2 to 5 show different metal insert bodies in cross section in the chucked state.

FIG. 2 shows the metal insert body 1 of FIG. 1 in cross section. The cross section of the metal insert body 1 has the shape of a triangle 15, which is chucked in a chuck having three jaws 21, 22, 23.

Figure 3:
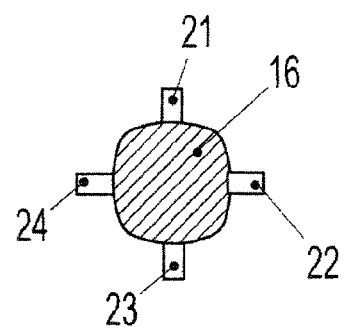

FIG. 3 shows a metal insert body with a square cross section 16 having rounded edges. The square cross section can be chucked in a simple manner in a tool having four jaws 21 to 24.

Figure 4:
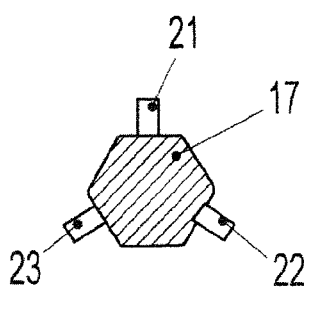

FIG. 4 shows a metal insert body with a hexagonal cross section 17 that is chucked in a three-jaw tool having three jaws 21 to 23.

Figure 5:
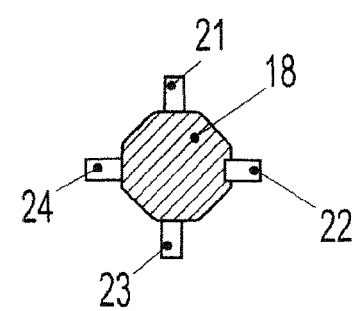

FIG. 5 shows a metal insert body with an octagonal cross section 18 that is chucked in a four-jaw tool having four jaws 21 to 24.

Figure 6:
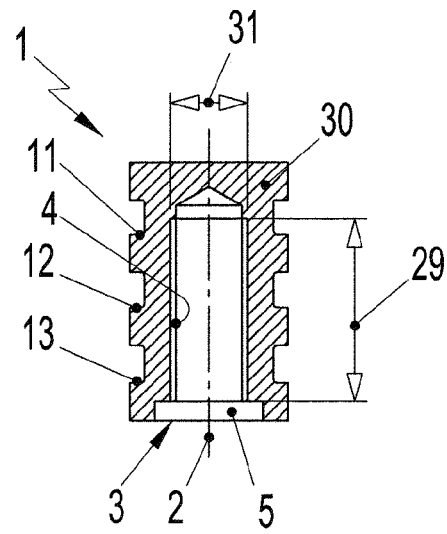
FIG. 6 shows the metal insert body from FIG. 1 in longitudinal section.

FIG. 6 shows the metal insert body 1 of FIG. 1 in longitudinal section. The length of the thread in the blind hole 4 is indicated by a double-headed arrow 29. The diameter of the thread is indicated by a further double-headed arrow 31. In longitudinal section, it can be seen that sufficient material 30 is provided in the radial direction between the thread and the outer mold contour of the metal insert body 1 with the annular grooves 11 to 13 to ensure that the metal insert body 1 has a high strength. In addition, the storage of material 30 makes it possible to repair the thread after damage.

Figure 7:
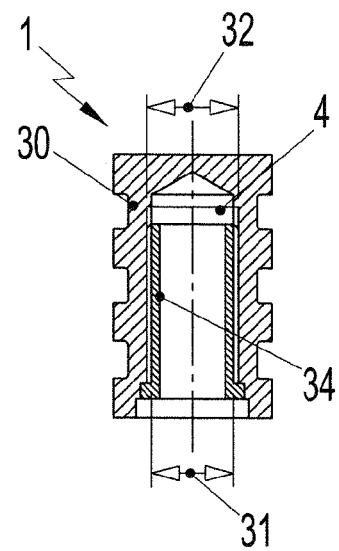
FIG. 7 shows the metal insert body from FIG. 6 with a threaded insert.

FIG. 7 shows a longitudinal section of the metal insert body 1 from FIG. 6 after a repair. The original thread, for example M12, has been enlarged to a diameter 32. A threaded insert 34 has been inserted into the enlarged blind hole 4. The storage of material 30 ensures sufficient material is still present after the enlargement and insertion of the threaded insert 34 to ensure that the metal insert body 1 has a high strength in the cast-in state. Alternatively, it is possible to cut a larger thread, for example M14, into the enlarged blind hole 4.

Figure 8:
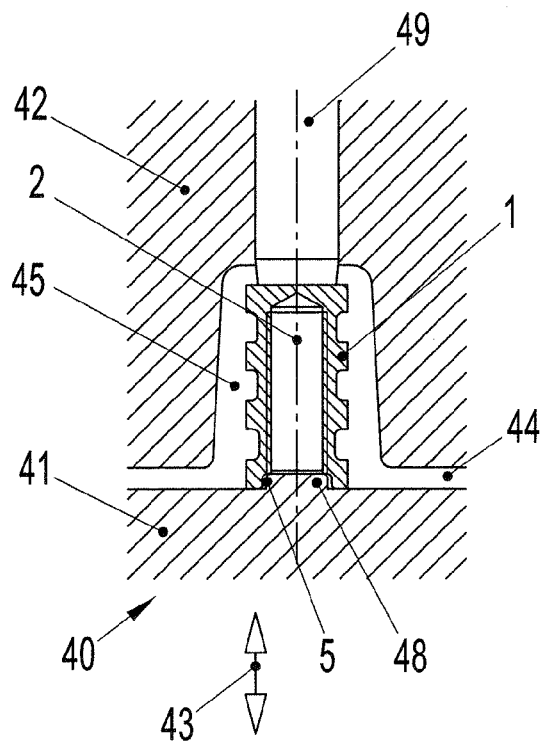
FIGS. 8 to 12 show various embodiments of a mold for the casting-in of the metal insert body shown in FIG. 1.

FIG. 8 shows a casting mold 40 comprising a lower mold half 41 and an upper mold half 42 in section. A double-headed arrow 43 indicates the main demolding direction of the mold 40. A cavity 44, into which molten metal is introduced during a casting operation, is formed between the two mold halves 41 and 42.

The cavity 44 widens into a dome 45 that is cut out in the upper mold half 42. The metal insert body 1 is positioned in the dome 45 with the aid of a positioning lug 48 and a positioning pin 49. The positioning lug 48 is a circular disk and is connected integrally to the lower mold half 41. The metal insert body 1 is attached by the cylindrical counterbore 5 onto the positioning lug 48.

The positioning pin 49 can move back and forth in the upper mold half 42 along the direction of the longitudinal axis 2 of the metal insert body 1 so that the free end of the positioning pin 49 bears against the closed end of the metal insert body 1. The positioning pin 49 is pretensioned hydraulically counter to the metal insert body 1 so that the metal insert body 1 is positioned securely in the dome 45 before and during the casting-in. The positioning pin 49 is operated hydraulically in a manner similar to an ejector and serves to securely clamp the metal insert body 1 during the casting operation.

Figure 9:
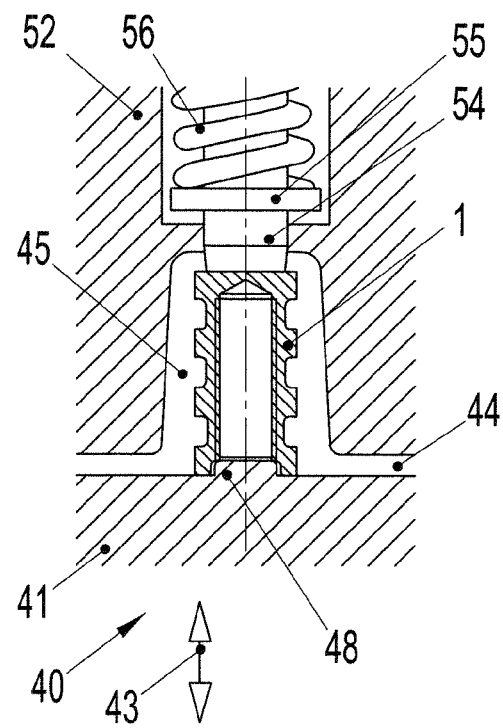

FIG. 9 shows a casting mold 40 similar to that in FIG. 8, with a modified upper mold half 52, in section. A positioning pin 54 is arranged in the upper mold half 52 and is pretensioned mechanically counter to the metal insert body 1 by spring force.

The positioning pin 54 has a collar 55 that is subjected to the pretensioning force of a helical compression spring 56. The spring-pretensioned positioning pin 54 positions the metal insert body 1 automatically when the mold 40 is being closed.

Figure 10:
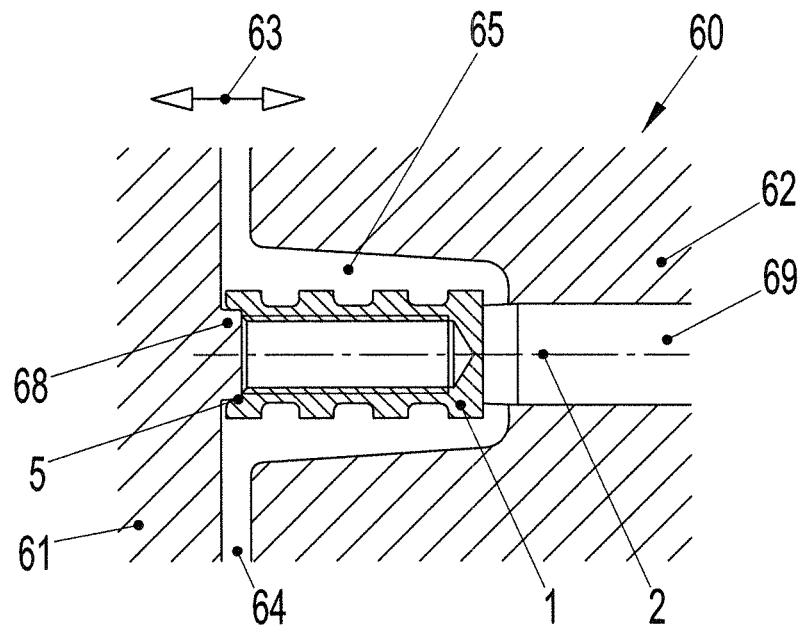
Figure 11:
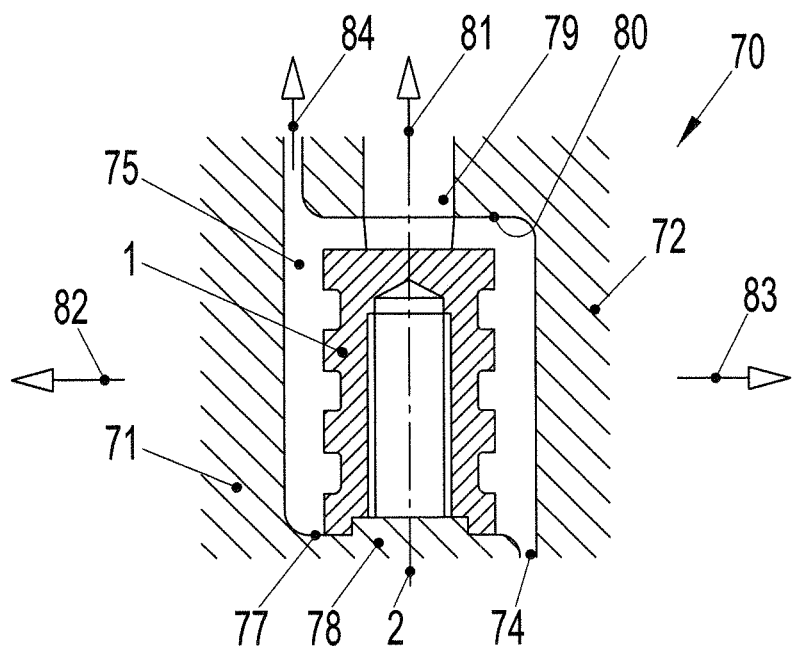
Figure 12:
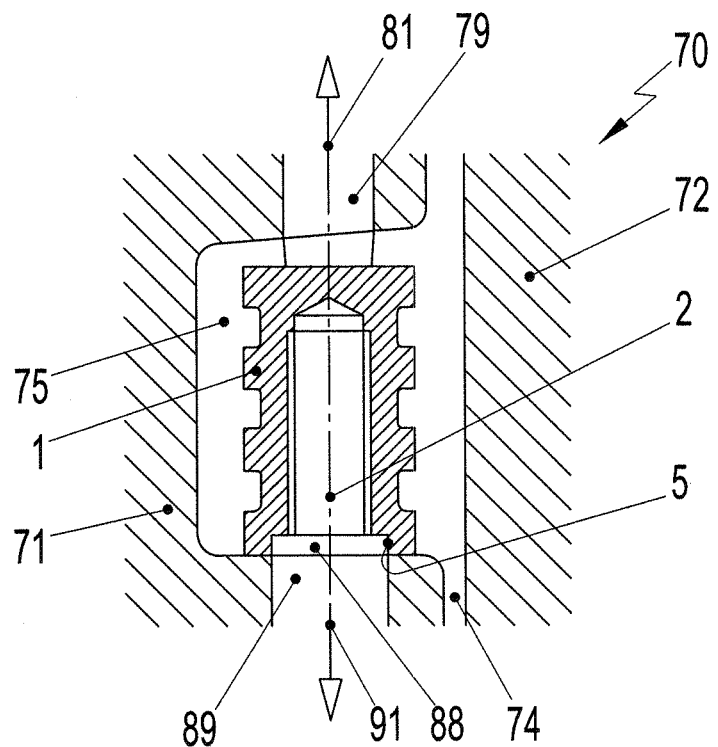

The mold 40 of FIGS. 8 and 9 has a parting plane that extends in the horizontal direction. FIGS. 10 to 12 show molds 60 and 70 with a vertical parting plane.

The mold 60 shown in FIG. 10 has a left-hand mold half 61 and a right-hand mold half 62. A double-headed arrow 63 indicates the demolding direction, which corresponds to the longitudinal axis 2. A cavity 64 and a dome 65 are designed in exactly the same way as in the mold 40 with a horizontal parting of the mold. The metal insert body 1 is chucked between a positioning lug 68 and a positioning pin 69.

To simplify the positioning of the metal insert body 1 before the mold 60 is closed, the positioning lug 68 preferably has a slightly conical design so that the metal insert body 1 can be attached by way of the cylindrical counterbore 5 with a certain degree of self-locking onto the positioning lug 68. The self-locking secures against undesirable release or falling out of the metal insert body 1 before the two mold halves 61 and 62 are brought together. After the two mold halves 61 and 62 have been brought together, or as they are being brought together, the metal insert body 1 is positioned in stably in the dome 65 with the aid of the positioning pin 69 for the casting operation.

FIG. 11 shows a mold 70 having a left-hand mold half 71 and a right-hand mold half 72. In contrast to the preceding exemplary embodiment, a cavity 74 together with a dome 75 is formed between the two mold halves 71 and 72 so that the longitudinal axis 2 of the metal insert body 1 in the dome 75 is inclined slightly with respect to the vertical. A positioning lug 78 is formed on a shoulder 77 of the left-hand mold half 71.

A positioning pin 79 extends through a shoulder 80 on the right-hand mold half 72 to the metal insert body 1. An arrow 81 indicates the direction in which the positioning pin 79 moves when pulled. Arrows 82 and 83 indicate the opening movements of the mold halves 71 and 72. When the mold 70 is being opened, the finished casting remains with the metal insert body 1 adhering to the left-hand mold half 71. A further arrow 84 indicates the direction in which the finished casting can be removed from the left-hand mold half 71.

FIG. 12 shows a mold 70 similar to the mold shown in FIG. 11, with a positioning lug 88. In contrast to the preceding embodiment, the positioning lug 88 is attached to an additional positioning pin 89 that can move in the left-hand mold half 71. If the positioning pin 89 moves in the direction of an arrow 91, it is possible for the positioning lug 88 to be removed from the cylindrical counterbore 5 of the metal insert body 1 during or after the opening of the mold 70. The removal of the finished casting from the mold 70 thus is simplified, and the finished metal casting can fall out automatically.

Figure 13:
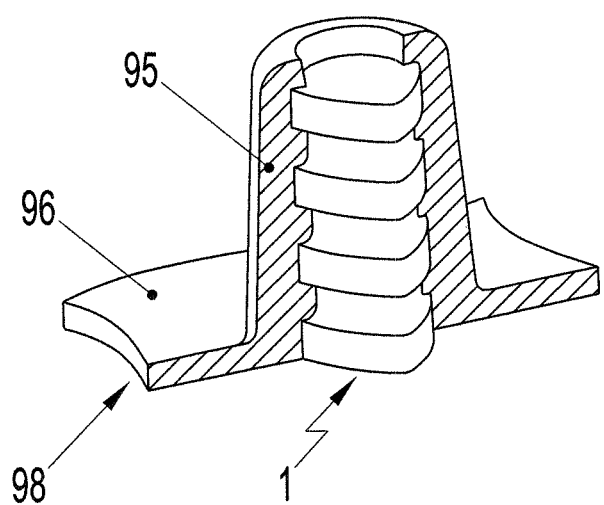
FIG. 13 is a perspective sectional illustration of a metal casting according to the invention.

FIG. 13 is a perspective view, partially in section, of a finished metal casting 98. The metal casting 98 comprises a metal casting base body 95 that has substantially the shape of a slightly conical sleeve into which the metal insert body 1 is cast. A planar structural part 96 emanates from the metal casting base body 95. The planar structural part 96 and the metal casting base body 95 are shown in section, so that the cast-in metal insert body 1 is visible.

Figures 14, 15:
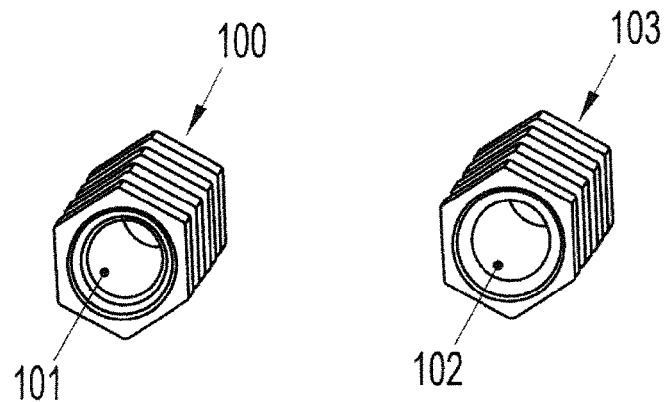
FIGS. 14 to 17 are perspective illustrations of further exemplary embodiments of the metal insert body shown in FIG. 1.

FIG. 14 is a perspective view of a metal insert body 100 having a threaded clearance hole 101. As in the preceding embodiments, the metal insert body 100 has three annular grooves.

FIG. 15 is a perspective view of a metal insert body 103 with a clearance hole 102. In contrast to the preceding embodiments, the clearance hole 102 is not threaded.

Figure 16:
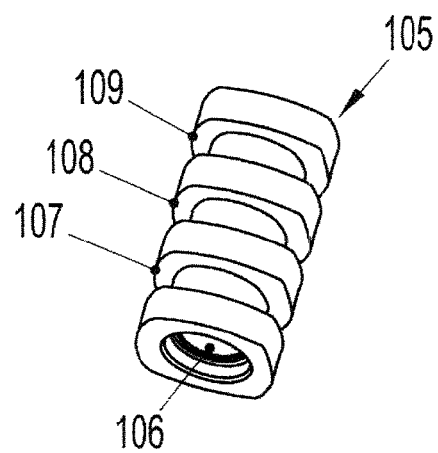

FIG. 16 is a perspective view of a metal insert body 105 as shown in FIG. 3. The metal insert body 105 has a threaded blind hole 106. The outer mold contour of the metal insert body 105 has three annular grooves 107, 108, 109.

Figure 17:
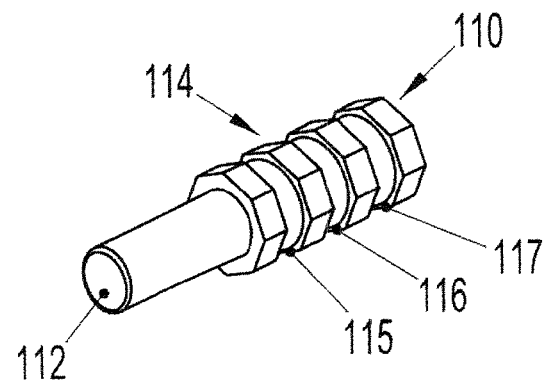

FIG. 17 is a perspective illustration of a metal insert body 110 having a functional bolt 112 with an external thread. An outer mold contour 114 of the metal insert body 110 has an octagonal cross section interrupted in the longitudinal direction by three annular grooves 115, 116, 117.

Figure 18:
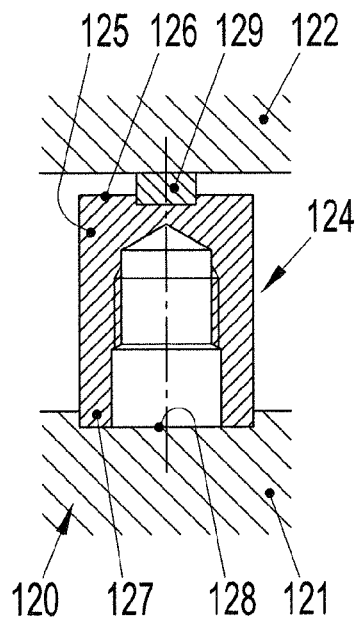
FIGS. 18 to 22 are illustrations similar to those in FIGS. 8 to 12 according to further exemplary embodiments.
Figure 19:
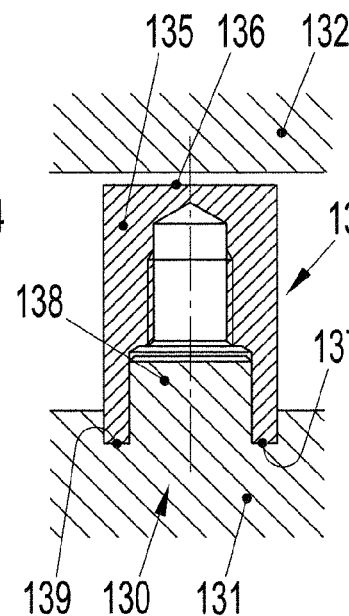
Figure 20:
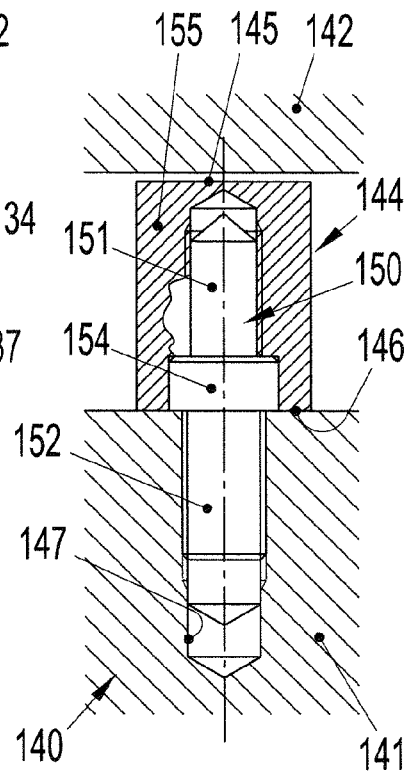

FIGS. 18 to 20 each show, in section, a casting mold 120; 130; 140 having a lower mold half 121; 131; 141 and an upper mold half 122; 132; 142. A cavity 124; 134; 144 is formed in each case between the two mold halves 121; 131; 141 and 122; 132; 142 for receiving a metal insert body 125; 135; 155 similar to those in the preceding embodiments.

The metal insert body 125; 135; 155 has a closed end 126; 136; 145 and an open end 127; 137; 146. The insert body 125; 135; 155 has a substantially sleeve-like shape at the open end 127; 137; 146.

In the embodiment of FIG. 18, the open end 127 of the metal insert body 125 is in a substantially circular depression 128 that is cut out in the lower mold half 121. In addition, a clamping element 129 is arranged between the closed end 126 of the metal insert body 125 and the upper mold half 122. The clamping element 129 preferably is formed from a soft metal and holds the open end 127 of the metal insert body 125 in the depression 128 so that the body bears tightly against the lower mold half 121.

In the exemplary embodiment of FIG. 19, the open end 137 of the metal insert body 135 accommodates a positioning spike 138 formed on the lower mold half 131. The positioning spike 138 is a substantially straight circular cylinder and is surrounded by an annular groove 139 that receives the open end 137 of the metal insert body 135. The fit between the positioning spike 138 and the open end 137 of the metal insert body 135 is preferably chosen such that the metal insert body 135 is held on the lower mold half 131 without any play and secured against tilting.

FIG. 20 shows an embodiment with a set screw 150. The set screw 150 comprises two threaded pins 151, 152 that extend in opposite directions and are separated from one another by a collar 154. The threaded pin 151 is screwed into the metal insert body 155. The threaded pin 152 is screwed into a threaded blind hole 147 provided in the lower mold half 141. The set screw 150 holds the metal insert body 155 securely on the lower mold half 141 during the casting. In addition, undesirable penetration of metal into the metal insert body during the casting is prevented reliably, as in the embodiments FIGS. 18 and 19.

Figure 21:
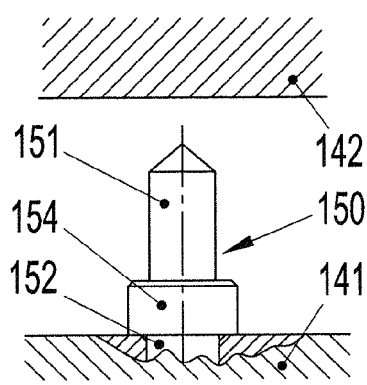

FIG. 21 shows the set screw 150 without the metal insert body between the two mold halves 141 and 142.

Figure 22:
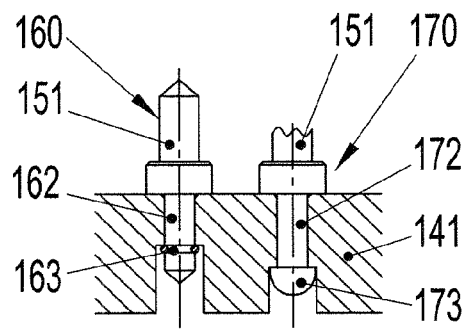

FIG. 22 shows that the set screw shown in FIGS. 20 and 21 also can be formed differently at the end that protrudes into the lower mold half 141. The left-hand part of FIG. 22 shows a set screw 160 having a threaded pin 151 at its upper end for screwing on a metal insert body. At its lower end, the set screw 160 has a smooth pin 162 that is held on the lower mold half 141 with the aid of an axial securing element 163. The axial securing element 163 engages into an annular groove formed on the pin 162.

The right-hand side of FIG. 22 shows a set screw 170 having, at its lower end, a pin 172 with a thickened portion 173 at its free end. The thickened portion 173 represents a positively locking element that holds the set screw 170 on the lower mold half 141. The thickened portion 173 may have a slot for the attachment of a screwing tool, which can be used to set the set screw 170 in rotation to make it possible to release the cast-in metal insert body from the lower mold half 141.

What is claimed is:

1. A metal casting comprising:
    at least one elongate metal insert body with a longitudinal axis and a plurality of axially spaced anti-twisting part-contours defined by an outer mold contour and spaced apart from one another in a direction parallel to the longitudinal axis, each of the axially spaced anti-twisting part-contours having identical non-cylindrical cross section with at least three outwardly convex curved surfaces meeting at curved or linear corners extending parallel to the longitudinal axis, the outer mold contour being interrupted by annular grooves at longitudinally spaced positions and disposed respectively between the axially spaced anti-twisting part-contours, a functional opening extending into one longitudinal end of the metal insert body, the metal insert body having a closed longitudinal end opposite the longitudinal end that has the functional opening; and
    a metal casting base body defining a unitary matrix of metal surrounding at least parts of the outer mold contour and the annular grooves of the metal insert body in a positively locking manner, while leaving the functional opening exposed, the metal casting base body covering only an outer peripheral region of the closed longitudinal end of the metal insert body with a central area of the closed longitudinal end being exposed.

2. The metal casting of claim 1, wherein the annular grooves have a substantially rectangular cross section.

3. The metal casting of claim 2, wherein the annular grooves are machined with a removal of material.

4. The metal casting of claim 1, wherein the metal insert body with the outer mold contour and the annular grooves is cast completely into the metal casting base body.

5. The metal casting of claim 1, characterized in that the functional opening comprises a recessed counterbore for positioning the metal insert body before casting-in, the counterbore being cross-sectionally larger than the functional opening and being exposed from the metal casting base body at the longitudinal end of the metal insert body.

6. The metal casting of claim 1, wherein the metal casting base body is formed from light metal.

7. The metal casting of claim 1, wherein the metal insert body comprises at least one of an aluminum material, a steel material and titanium.

8. The metal casting of claim 1, wherein the metal insert body is formed from a bar material as an extruded profile, a rolled profile or an impact-extruded part.

9. The metal casting of claim 1, wherein the metal insert body is rolled, drawn, forged or produced by impact extrusion.

10. The metal casting of claim 1, wherein the outer mold contour has a rough exterior.

11. The metal casting of claim 1, wherein an end face of the metal insert body is formed to prevent injection of metal into the metal insert body.

12. The metal casting of claim 1, wherein the metal casting base body includes a sleeve surrounding the metal insert body and at least one substantially plate-shaped structural part unitary with the sleeve and extending from the sleeve at a position adjacent the longitudinal end of the metal insert body that has the functional opening.

13. The metal casting of claim 12, wherein the substantially plate-shaped structural part is substantially perpendicular to the longitudinal axis of the metal insert body.

14. The metal casting of claim 12, wherein the substantially plate-shaped structural part is substantially parallel to the longitudinal axis of the metal insert body.

15. A metal product comprising:
    at least one elongate metal insert body with a longitudinal axis and opposite first and second longitudinal ends spaced apart along the longitudinal axis, an outer mold contour between the first and second longitudinal ends, the outer mold contour having a plurality of axially spaced anti-twisting part-contours, each of the axially spaced anti-twisting part-contours having identical non-cylindrical cross sections, the outer mold contour being interrupted by annular grooves at longitudinally spaced positions and disposed respectively between the axially spaced anti-twisting part-contours, a functional opening extending into the first longitudinal end of the metal insert body and the second longitudinal end of the metal insert body being closed, the functional opening having a counterbore at the first longitudinal end of the metal insert body; and
    a metal casting base body defining a unitary matrix of metal forming a sleeve surrounding at least parts of the outer mold contour and the annular grooves of the metal insert body in a positively locking manner, while leaving exposed the functional opening and a central portion of the second longitudinal end of the metal insert body inward of the outer mold contour, the metal casting base body further including at least one plate-shaped structural part unitary with the sleeve and extending from the sleeve at least at a position adjacent the longitudinal end of the metal insert body that has the functional opening.

16. The metal product of claim 15, wherein the plate-shaped structural part is substantially perpendicular to the longitudinal axis of the metal insert body.

17. The metal product of claim 15, wherein the plate-shaped structural part is substantially parallel to the longitudinal axis of the metal insert body.

* * * * *